United States Patent
Yang

(10) Patent No.: US 11,507,083 B2
(45) Date of Patent: Nov. 22, 2022

(54) REMOTE CONTROL DEVICE AND REMOTE CONTROL METHOD FOR AUTOMATIC DRIVING VEHICLE, AND SERVER

(71) Applicant: BAIDU ONLINE NETWORK TECHNOLOGY (BEIJING) CO., LTD., Beijing (CN)

(72) Inventor: Jialin Yang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 572 days.

(21) Appl. No.: 16/557,439

(22) Filed: Aug. 30, 2019

(65) Prior Publication Data
US 2020/0073377 A1 Mar. 5, 2020

(30) Foreign Application Priority Data
Aug. 31, 2018 (CN) .......................... 201811008173.2

(51) Int. Cl.
*G05D 1/00* (2006.01)
*H04W 72/04* (2009.01)
(Continued)

(52) U.S. Cl.
CPC ......... *G05D 1/0022* (2013.01); *G05D 1/0061* (2013.01); *H04W 4/029* (2018.02);
(Continued)

(58) Field of Classification Search
CPC ... G05D 1/0022; G05D 1/0061; H04W 4/029; H04W 4/40; H04W 72/0426; H04W 72/087; G06Q 50/28
See application file for complete search history.

(56) References Cited

U.S. PATENT DOCUMENTS

| 9,626,874 B1 | 4/2017 | Gupta et al. |
| 2011/0125344 A1 | 5/2011 | An et al. |

(Continued)

FOREIGN PATENT DOCUMENTS

| CN | 101938805 A | 1/2011 |
| CN | 102377948 A | 3/2012 |

(Continued)

OTHER PUBLICATIONS

Chinese Patent Application No. 201811008173.2 English translation of Second Office Action dated Sep. 16, 2020, 7 pages.

(Continued)

*Primary Examiner* — Anne Marie Antonucci
*Assistant Examiner* — Patrick M Brady
(74) *Attorney, Agent, or Firm* — Lathrop GPM LLP

(57) ABSTRACT

The present disclosure provides a server, a remote control device, and a remote control method for an automatic (or autonomous) driving vehicle. The method may include: after receiving a remote control request of an automatic driving vehicle, acquiring a target wireless channel of a target wireless network with the shortest communication delay from a plurality of candidate wireless channels of a plurality of candidate wireless networks in combination with the current geographic location of the automatic driving vehicle, and transmitting a corresponding control instruction to the automatic driving vehicle through the target wireless channel of the target wireless network.

12 Claims, 5 Drawing Sheets

(51) Int. Cl.
*H04W 4/40* (2018.01)
*H04W 72/08* (2009.01)
*H04W 4/029* (2018.01)

(52) U.S. Cl.
CPC ......... *H04W 4/40* (2018.02); *H04W 72/0426* (2013.01); *H04W 72/087* (2013.01)

(56) References Cited

U.S. PATENT DOCUMENTS

| | | | |
|---|---|---|---|
| 2015/0126148 A1* | 5/2015 | Hong | H04W 4/029 455/405 |
| 2017/0142766 A1 | 5/2017 | Kim | |
| 2017/0223712 A1* | 8/2017 | Stephens | H04W 72/0446 |
| 2018/0176859 A1* | 6/2018 | Haines | H04W 4/02 |
| 2018/0232839 A1* | 8/2018 | Heinla | G05D 1/0088 |
| 2020/0073376 A1* | 3/2020 | Yang | G05D 1/0022 |

FOREIGN PATENT DOCUMENTS

| | | |
|---|---|---|
| CN | 103916334 A | 7/2014 |
| CN | 105196911 A | 12/2015 |
| CN | 106255121 A | 12/2016 |
| CN | 106304307 A | 1/2017 |
| CN | 106998351 A | 8/2017 |
| CN | 107656519 A | 2/2018 |
| JP | 2013162377 A | 8/2013 |
| WO | WO-2008006062 A1 * | 1/2008 ........... G01S 5/0289 |
| WO | WO 2016038931 A1 | 3/2016 |

OTHER PUBLICATIONS

Chinese Patent Application No. 201811008173.2 Second Office Action dated Sep. 16, 2020, 6 pages.
Chinese Patent Application No. 201811008173.2 First Office Action dated Jun. 10, 2020, 5 pages.
Chinese Patent Application No. 201811008173.2 English translation of First Office Action dated Jun. 10, 2020, 6 pages.
Japanese Patent Application No. 2019-149709 First Office Action dated Sep. 1, 2020, 6 pages.
Japanese Patent Application No. 2019-149709 English translation of First Office Action dated Sep. 1, 2020, 10 pages.
European Patent Application No. 19194576.5 extended Search and Opinion dated Dec. 9, 2019, 5 pages.

* cited by examiner

REMOTE CONTROL DEVICE AND REMOTE CONTROL METHOD FOR AUTOMATIC DRIVING VEHICLE, AND SERVER

CROSS REFERENCE TO RELATED APPLICATIONS

This application is based on and claims priority to Chinese patent application Serial No. 201811008173.2, filed on Aug. 31, 2018, the entire contents of which are incorporated herein by reference.

TECHNICAL FIELD

The present disclosure relates to the field of automatic driving technology, and more particularly, to a server, a remote control device, and a remote control method for an automatic driving vehicle.

BACKGROUND

Currently, in the field of automatic driving, when an automatic driving vehicle encounters extreme circumstances, for example, technical failure, sudden acceleration or deceleration caused by unexplained reasons, and in a close distance to the obstacle, a remote manual driving mode is required to help the automatic driving vehicle handle the extreme circumstances.

In the related art, a remote control terminal usually adopts a wireless channel of a single fixed network to remotely interact with the automatic driving vehicle, so as to manually control the automatic driving vehicle. However, since the network environment is affected by many factors, the wireless communication delay between the remote control terminal and the automatic driving vehicle can be unstable, and the control instruction of the remote control terminal may not be transmitted to the automatic driving vehicle in time. As a result, the response operation of the autonomous (automatic driving) vehicle is limited by these factors and the driving safety of the vehicle may be compromised.

SUMMARY

The present disclosure aims to solve at least one of the above problems to at least some extent.

Embodiments of a first aspect of the present disclosure provide a remote control method for an automatic driving vehicle. The method includes: receiving a remote control request transmitted by an automatic driving vehicle; acquiring current geographic location information of the automatic driving vehicle according to information carried by the remote control request; acquiring a target wireless channel with a shortest communication delay from a plurality of candidate wireless channels of a plurality of candidate wireless networks according to the current geographic location information, and acquiring a target wireless network corresponding to the target wireless channel; determining a control instruction according to the remote control request; and transmitting the control instruction to the automatic driving vehicle by using the target wireless channel of the target wireless network.

Embodiments of a second aspect of the present disclosure provide a remote control device for an automatic driving vehicle. The device includes: a processor and a memory configured to store software modules executable by the processor. The processor is configured to run a program corresponding to the software modules by reading the software modules stored in the memory. The software modules include: a receiving module, configured to receive a remote control request transmitted by an automatic driving vehicle; a first acquiring module, configured to acquire current geographic location information of the automatic driving vehicle according to information carried by the remote control request; a second acquiring module, configured to acquire a target wireless channel with a shortest communication delay from a plurality of candidate wireless channels of a plurality of candidate wireless networks according to the current geographic location information, and acquire a target wireless network corresponding to the target wireless channel; a first determining module, configured to determine a corresponding control instruction according to the remote control request; and a transmitting module, configured to transmit the control instruction to the automatic driving vehicle by using the target wireless channel of the target wireless network.

Embodiments of a third aspect of the present disclosure provide a server. The server includes a processor and a memory. The processor is configured to run a program corresponding to executable program codes by reading the executable program codes stored in the memory, for implementing the remote control method for an autonomous vehicle according to the above embodiments.

Embodiments of a fourth aspect of the present disclosure provide a remote control system for an automatic driving vehicle. The system comprises a server and an automatic driving vehicle. The server is configured to receive a remote control request transmitted by the automatic driving vehicle, to acquire current geographic location information of the automatic driving vehicle according to information carried by the remote control request, to acquire a target wireless channel with a shortest communication delay from a plurality of candidate wireless channels of a plurality of candidate wireless networks according to the current geographic location information, to acquire a target wireless network corresponding to the target wireless channel, to determine a corresponding control instruction according to the remote control request; and to transmit the control instruction by using the target wireless channel of the target wireless network. The automatic driving vehicle is configured to transmit the remote control request to the server, and to receive the control instruction transmitted by the server.

Embodiments of a fifth aspect of the present disclosure provide a non-transitory computer readable storage medium having a computer program stored thereon. When the computer program is executed by a processor, the remote control method for an automatic driving vehicle according to embodiments of the present disclosure is implemented.

Embodiments of a sixth aspect of the present disclosure provide a computer program product. When instructions in the computer program product are executed by a processor, the remote control method for an automatic driving vehicle according to embodiments of the present disclosure is implemented.

Additional aspects and advantages of the present disclosure will be given in the following description, some of which will become apparent from the following description or be learned from practices of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Embodiments of the present disclosure will be described below in detail, examples of which are illustrated in accompanying drawings. Throughout the drawings, the same or similar reference signs refer to the same or similar elements or elements that have the same or similar functions. The embodiments described below with reference to the accompanying drawings are merely exemplary and intends to illustrate and explain the present disclosure, and should not be construed as a limit to the present disclosure.

A remote control method, a remote control device, a server, and a remote control system for an automatic driving vehicle according to embodiments of the present disclosure will be described below with reference to the accompanying drawings. For purpose of this disclosure, the term "automatic driving vehicle" means a vehicle capable of navigating roadways and/or interpreting traffic-control devices without a driver physically operating any of the vehicle's control systems.

Figure 1:
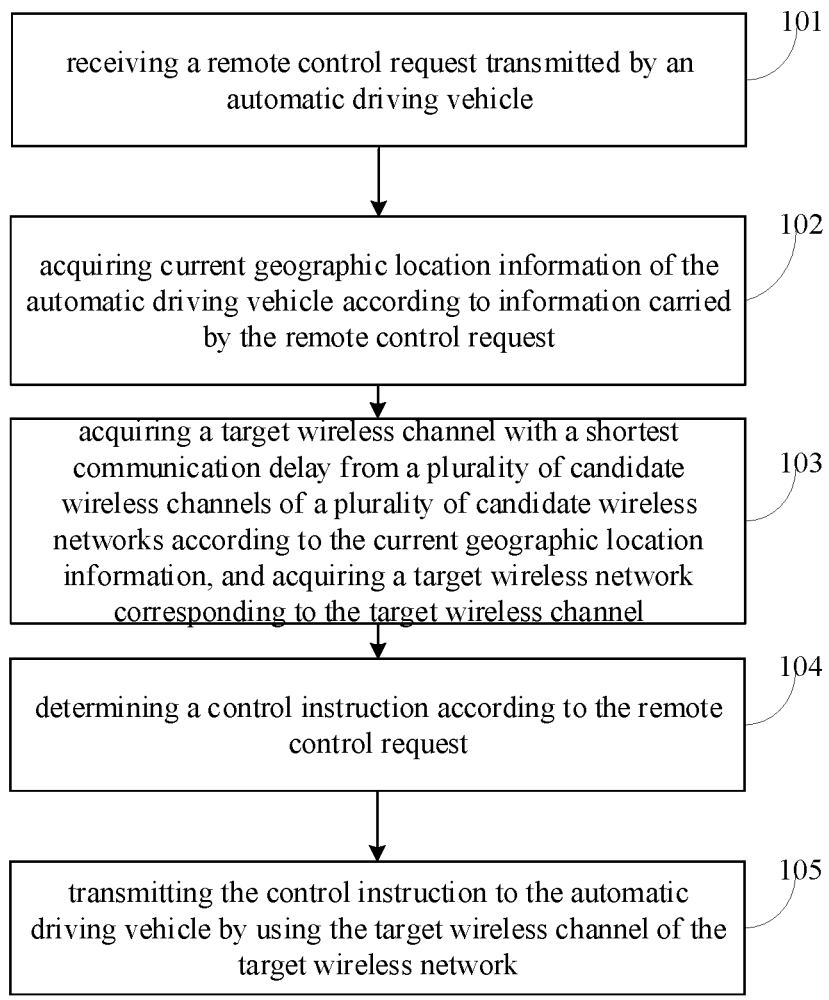
FIG. 1 is a flow chart of a remote control method for an automatic driving vehicle according to an embodiment of the present disclosure.

FIG. 1 is a flow chart of a remote control method for an automatic driving vehicle according to an embodiment of the present disclosure.

As illustrated in FIG. 1, the remote control method for an automatic driving vehicle may include the following steps.

At step 101, a remote control request transmitted by an automatic driving vehicle is received.

It should be noted that the remote control method for the automatic driving vehicle of this embodiment is applied to a remote control device for an automatic driving vehicle, and the remote control device for the automatic driving vehicle is located on a server.

Specifically, when it is determined that remote control of the automatic driving vehicle is required, the automatic driving vehicle may transmit the remote control request to the server corresponding to the remote control.

The remote control of the automatic driving vehicle is required in the situations including, but not limited to, a situation in which the automatic driving vehicle encounters a condition outside the range of known driving conditions, a sudden acceleration or deceleration of the automatic driving vehicle, a malfunction of the automatic driving control strategy of the automatic driving vehicle, which is not limited in the embodiment.

For example, when the automatic driving vehicle encounters a strangely shaped obstacle on the front road, the automatic driving vehicle stops moving forward and transmits the remote control request to the server, such that the server controls the automatic driving vehicle to keep moving or change lanes.

At step 102, current geographic location information of the automatic driving vehicle is acquired according to information carried by the remote control request.

It should be understood that, in different scenarios, the manner in which the current geographical location information of the automatic driving vehicle is acquired according to the information carried by the remote control request is different.

As an example, if the remote control request carries the vehicle identification information of the automatic driving vehicle, the server transmits a positioning request carrying the vehicle identification information to a location-based positioning server. Correspondingly, the positioning server acquires geographical location information corresponding to the vehicle identification information, and feeds back the geographical location information to the server. The geographical location information fed back by the positioning server is the current geographical location information of the automatic driving vehicle.

As another example, if the remote control request carries the vehicle identification information of the automatic driving vehicle, the server acquires the geographical location information corresponding to the vehicle identification information. The acquired geographical location information is the current geographical location information of the automatic driving vehicle.

As yet another example, if the remote control request carries the global positioning information of the automatic driving vehicle, the server acquires the geographical location information corresponding to the global positioning information. The acquired geographical location information is the current geographical location information of the automatic driving vehicle.

At step 103, a target wireless channel with a shortest communication delay is acquired from a plurality of candidate wireless channels of a plurality of candidate wireless networks according to the current geographic location information, and a target wireless network corresponding to the target wireless channel is acquired.

The plurality of candidate wireless networks may be a plurality of different mobile communication networks. For example, the plurality of candidate wireless networks may be a plurality of wireless networks provided by a plurality of different mobile communication service providers.

As an exemplary implementation, after acquiring the current geographic location information of the automatic driving vehicle, communication delays of respective candidate wireless channels of the candidate wireless networks at the current geographic location are acquired according to a pre-stored correspondence among geographic locations, wireless networks, wireless channels, and communication delays, and then the target wireless channel with the shortest communication delay is determined according to the communication delays of the respective candidate wireless channels, and the target wireless network corresponding to the target wireless channel is acquired.

It should be noted that, for each geographic location, the communication delay corresponding to the wireless channel of each wireless network may be obtained by using a sniff technology.

The communication delay corresponding to the wireless channel of each wireless network is obtained by using the sniff technology as follows.

For each geographic location, the server sends a PING probe packet to a test terminal located at the current geographic location by using a preset wireless channel of a preset wireless network, and records the transmitting time of the PING probe packet, and obtains the receiving time of the test terminal sending the PING reply packet, and determines the communication delay of the preset wireless channel of the preset wireless network at the current geographical location according to the transmitting time and the receiving time.

The test terminal may be any electronic device having a communication function, and the test terminal may be an electronic device such as a smart phone, an automatic driving vehicle, or a portable device, which is not limited in the embodiment.

At step 104, a control instruction is determined according to the remote control request.

The control instruction may be a lane changing instruction, a forwarding instruction, a driving mode adjusting instruction, and the like.

It should be noted that, in different scenarios, the actual situation of the automatic driving vehicle is different, the information carried by the corresponding remote control request is different, or the type of the remote control request transmitted is different, and thus, the control instruction determined according to the remote control request is also different. Therefore, in the actual application, the corresponding control command can be determined in combination with the actual situation of the automatic driving vehicle, which is not limited in the embodiment.

It should be understood that the information carried by the remote control request may include not only the vehicle identification information of the automatic driving vehicle or the global positioning information of the automatic driving vehicle, but also surrounding environment information and vehicle state information of the automatic driving vehicle, and the like, so that the server may determine a corresponding control instruction according to the surrounding environment information and the vehicle state information of the automatic driving vehicle.

At step 105, the control instruction is transmitted to the automatic driving vehicle by using the target wireless channel of the target wireless network.

With the remote control method for an automatic driving vehicle according to embodiments of the present disclosure, after receiving the remote control request from the automatic driving vehicle, the target wireless channel of the target wireless network with the shortest communication delay is acquired from the plurality of candidate wireless channels of the candidate wireless networks according to the current geographic location of the automatic driving vehicle, and the control instruction is transmitted to the automatic driving vehicle by using the target wireless channel of the target wireless network. Therefore, the control instruction can reach the automatic driving vehicle in time, and low-delay communication requirements of the automatic driving vehicle can be satisfied, such that the automatic driving vehicle may rapidly respond to the control instruction, thereby improving the driving safety of the automatic driving vehicle.

Figure 2:
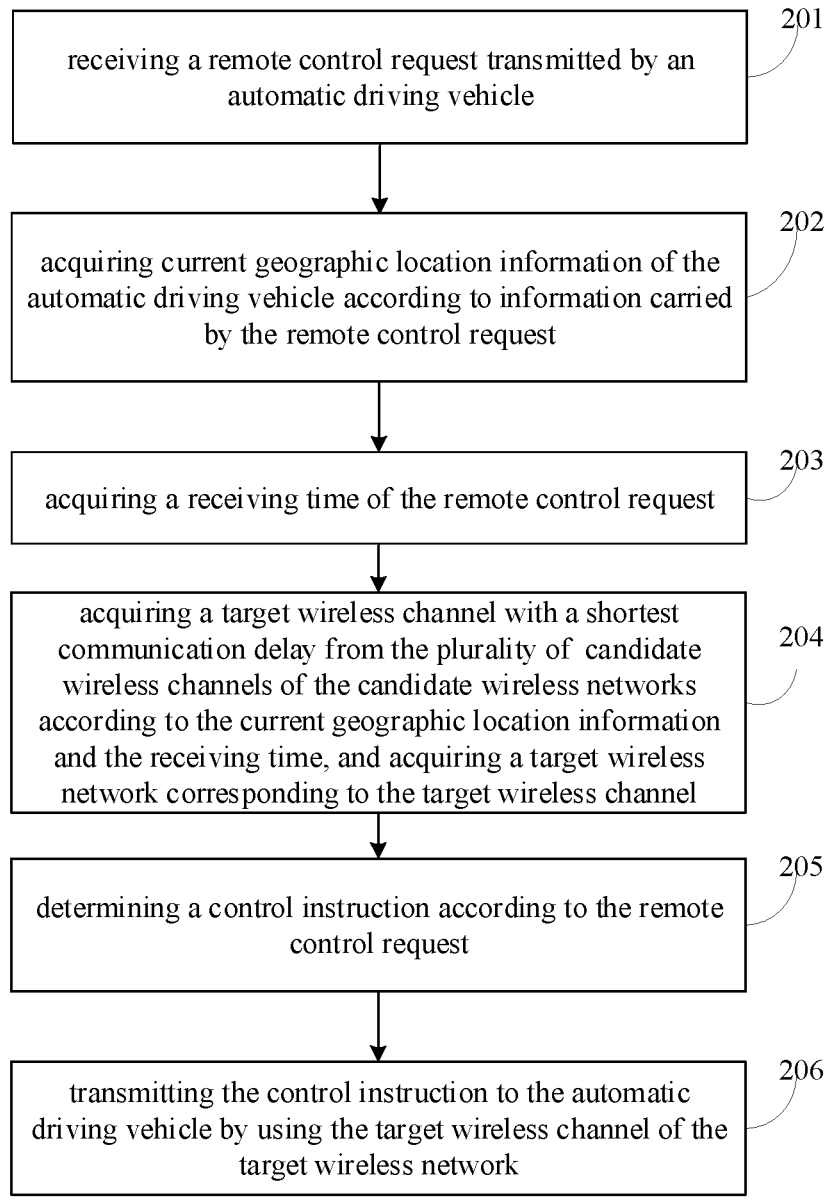
FIG. 2 is a flow chart of a remote control method for an automatic driving vehicle according to another embodiment of the present disclosure.

FIG. 2 is a flow chart of a remote control method for an automatic driving vehicle according to another embodiment of the present disclosure.

As illustrated in FIG. 2, the remote control method for an automatic driving vehicle may include the following steps.

At step 201, a remote control request transmitted by an automatic driving vehicle is received.

At step 202, current geographic location information of the automatic driving vehicle is acquired according to information carried by the remote control request.

It should be noted that the above explanations on steps 101-102 are applicable to steps 201-202 of the embodiment, and details are not described herein again.

At step 203, a receiving time of the remote control request is acquired.

At step 204, a target wireless channel with a shortest communication delay is acquired from a plurality of candidate wireless channels of a plurality of candidate wireless networks according to the current geographic location information and the receiving time, and a target wireless network corresponding to the target wireless channel is acquired.

It should be noted that, for a certain geographic location of a certain wireless network, the wireless channel used by the wireless network may be different in different time periods. Therefore, as an exemplary implementation, after obtaining the receiving time and the current geographical location information of the automatic driving vehicle, communication delays corresponding to respective candidate wireless channels of the candidate wireless networks are determined according to the receiving time and the current geographic location information. The target wireless channel with the shortest communication delay is acquired according to the communication delays of respective candidate wireless channels of the candidate wireless networks, and the target wireless network corresponding to the target wireless channel is determined.

Specifically, communication delays of respective candidate wireless channels of the candidate wireless networks at the current geographic location during the time period at which the receiving time is located are acquired according to the pre-stored correspondence among time periods, geographic locations, wireless networks, wireless channels, and communication delays, and then the target wireless channel with the shortest communication delay is determined according to the communication delays of respective candidate wireless channels of the target wireless networks, and the target wireless network corresponding to the target wireless channel is acquired.

At step 205, a control instruction is determined according to the remote control request.

At step 206, the control instruction is transmitted to the automatic driving vehicle by using the target wireless channel of the target wireless network.

With the remote control method for an automatic driving vehicle according to embodiments of the present disclosure, after receiving the remote control request from the automatic driving vehicle, the target wireless channel with the shortest communication delay is acquired from the plurality of candidate wireless channels of the candidate wireless networks according to the current geographic location of the automatic driving vehicle and the receiving time of the remote control request, and the target wireless network corresponding to the target wireless channel is acquired, and then the control instruction is transmitted to the automatic driving vehicle by using the target wireless channel of the target wireless network. Therefore, the control instruction can reach the automatic driving vehicle in time, and low-delay communication requirements of the automatic driving vehicle can be satisfied, such that the automatic driving vehicle may rapidly respond to the control instruction, thereby improving the driving safety of the automatic driving vehicle.

Figure 3:
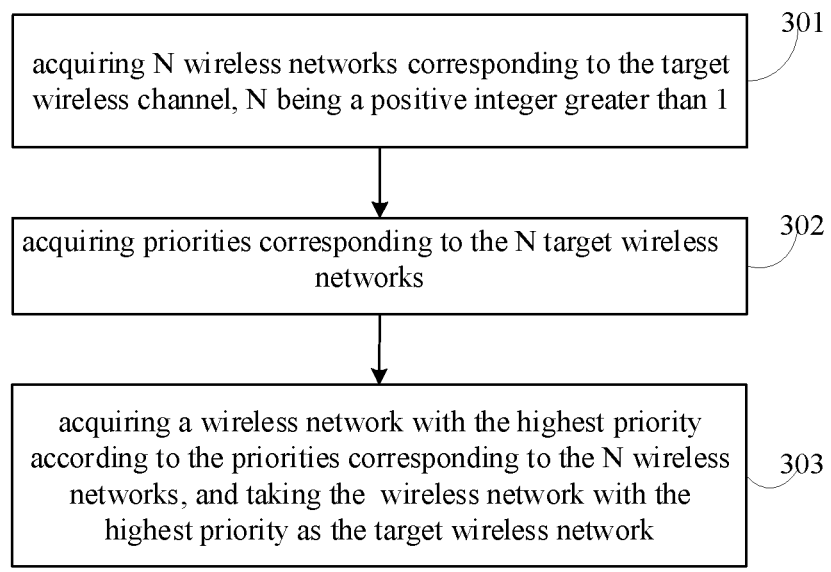
FIG. 3 is a flow chart of a remote control method for an automatic driving vehicle according to yet another embodiment of the present disclosure.

In an embodiment of the present disclosure, the number of the target wireless network is N, where N is a positive integer greater than one. Before transmitting the control instruction to the automatic driving vehicle via the target wireless channel of the target wireless network, the method may further include the following steps, as illustrated in FIG. 3.

At step 301, priorities corresponding to the N target wireless networks are acquired.

It should be noted that, in different scenarios, the manners for obtaining the priorities corresponding to the N target wireless networks are different, which will be illustrated in the following examples.

As an example, the priority of each of the target wireless networks at the current geographic location is obtained according to the pre-stored correspondence among geographic locations, wireless networks and priorities.

As another example, the historical usage number of each of the target wireless networks at the current geographic location is obtained, and the priority of each of the target wireless networks is determined according to the historical usage number of each of the target wireless networks.

At step 302, a target wireless network with a highest priority is acquired according to the priorities corresponding to the N target wireless networks, and the target wireless network with the highest priority is taken as the target wireless network.

At step 303, a wireless channel corresponding to the target wireless network with the highest priority level is acquired and served as the target wireless channel.

With the remote control method for the automatic driving vehicle according to the embodiments of the present disclosure, when the target wireless channel with the shortest communication delay corresponds to the plurality of target wireless networks during communication with the automatic driving vehicle, the target wireless network with the highest priority is determined according to priorities of the target wireless networks, and remote interaction with the automatic driving vehicle is performed by using the wireless channel of the target wireless network with the highest priority, so that the control instruction can reach the automatic driving vehicle in time, thereby ensuring real-time communication between the server and the automatic driving vehicle, improving the driving safety of the automatic driving vehicle and satisfying the remote interaction requirements of the automatic driving vehicle.

In order to achieve the above embodiments, the present disclosure further provides a remote control device for an automatic driving vehicle.

Figure 4:
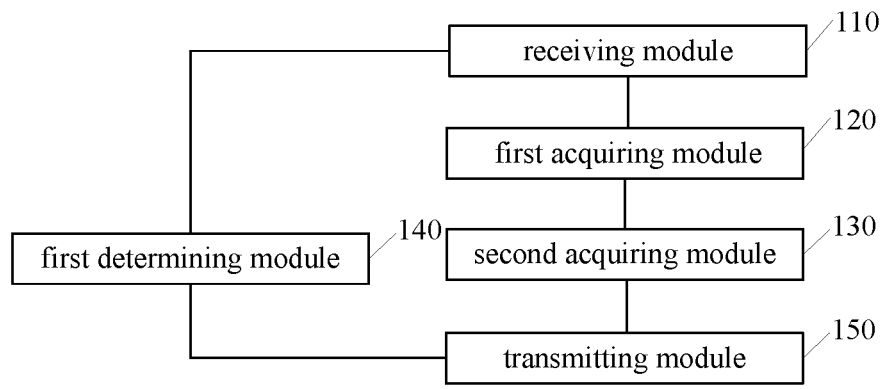
FIG. 4 is a schematic block diagram of a remote control device for an automatic driving vehicle according to an embodiment of the present disclosure.

FIG. 4 is a schematic block diagram of a remote control device for an automatic driving vehicle according to an embodiment of the present disclosure.

As illustrated in FIG. 4, the remote control device for an automatic driving vehicle includes a receiving module 110, a first acquiring module 120, a second acquiring module 130, a first determining module 140, and a transmitting module 150.

The receiving module 110 is configured to receive a remote control request transmitted by an automatic driving vehicle.

The first acquiring module 120 is configured to acquire current geographic location information of the automatic driving vehicle according to information carried by the remote control request.

The second acquiring module 130 is configured to acquire a target wireless channel with a shortest communication delay from a plurality of candidate wireless channels of a plurality of candidate wireless networks according to the current geographic location information, and acquire a target wireless network corresponding to the target wireless channel; The first determining module 140 is configured to determine a corresponding control instruction according to the remote control request.

The transmitting module 150 is configured to transmit the control instruction to the automatic driving vehicle by using the target wireless channel of the target wireless network.

In an embodiment of the present disclosure, the first determining module 150 is configured to: acquire communication delays of respective candidate wireless channels of the plurality of candidate wireless networks at the current geographic location according to a pre-stored correspondence among geographic locations, wireless networks, wireless channels, and communication delays; and determine the target wireless channel with the shortest communication delay according to the communication delays of respective candidate wireless channels, and acquire the target wireless network corresponding to the target wireless channel.

Figure 5:
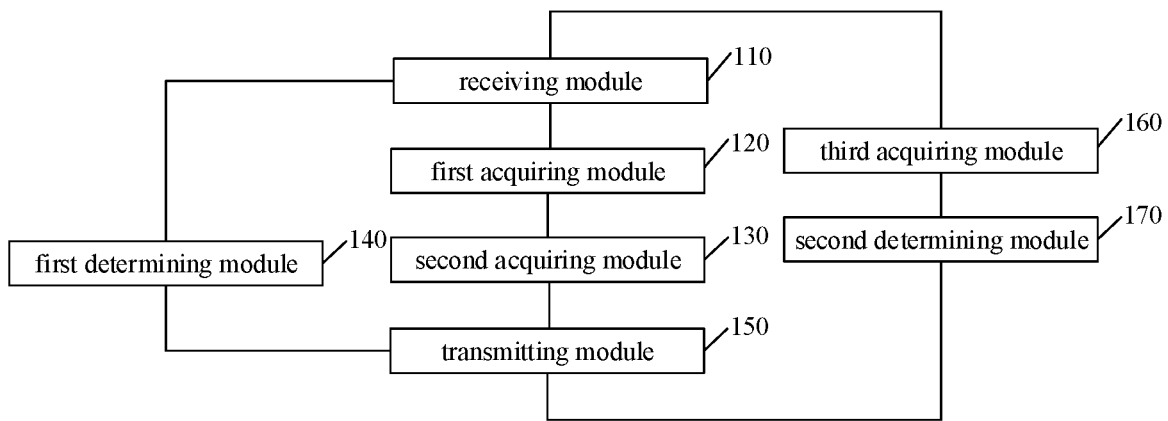
FIG. 5 is a schematic block diagram of a remote control device for an automatic driving vehicle according to another embodiment of the present disclosure.

In an embodiment of the present disclosure, on the basis of FIG. 4, as illustrated in FIG. 5, the device may further include a third acquiring module 160, and a second determining module 170.

The third acquiring module 160 is configured to acquire a receiving time of the remote control request.

The second determining module 170 is configured to acquire the target wireless channel with the shortest communication delay from the plurality of candidate wireless channels of the candidate wireless networks according to the receiving time and the current geographic location information, and acquire the target wireless channel corresponding to the target wireless network.

In an embodiment of the present disclosure, the second determining module 170 is configured to determine communication delays of respective candidate wireless channels of the candidate wireless networks according to the current geographic location information and the receiving time; and acquire the target wireless channel with the shortest communication delay according to communication delays of the respective candidate wireless channels, and determine the target wireless network corresponding to the target wireless channel.

Specifically, the second determining module 170 is configured to acquire communication delays of respective candidate wireless channels of the candidate wireless networks at the current geographic location during the time period at which the receiving time is located, according to the pre-stored correspondence among time periods, geographic locations, wireless networks, wireless channels, and communication delays, and acquire the target wireless channel with the shortest communication delay according to the communication delays of the respective candidate wireless channels of the candidate wireless networks, and determine the target wireless network corresponding to the target wireless channel.

Figure 6:
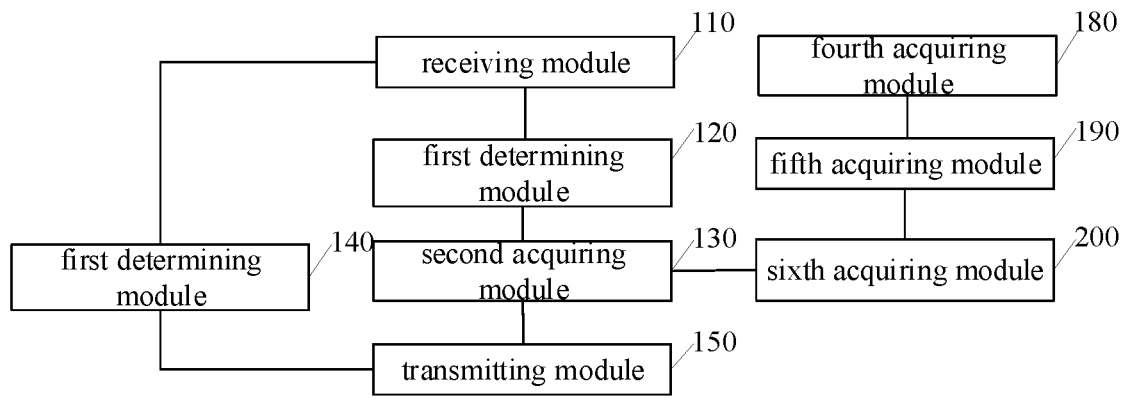
FIG. 6 is a schematic block diagram of a remote control device for an automatic driving vehicle according to yet another embodiment of the present disclosure.

In an embodiment of the present disclosure, the number of the target wireless network is N, where N is a positive integer greater than one. On the basis of FIG. 4, as illustrated in FIG. 6, the device may further include a fourth acquiring module 180, a fifth acquiring module 190, and a sixth acquiring module 200.

The fourth acquiring module 180 is configured to acquire priorities corresponding to the N target wireless networks.

The fifth acquiring module 190 is configured to acquire the target wireless network with the highest priority according to the priorities corresponding to the N target wireless networks, and take the target wireless network with the highest priority as the target wireless network.

The sixth acquiring module 200 is configured to acquire a wireless channel corresponding to the target wireless network with the highest priority as the target wireless channel.

It should be noted that the fourth acquiring module 180, the fifth acquiring module 190, and the sixth acquiring module 200 in the foregoing device embodiment shown in FIG. 6 may also be included in the foregoing device embodiment of FIG. 5, which is not limited in the embodiments.

It should be noted that the foregoing explanation of the embodiments of the remote control method for the automatic driving vehicle is also applicable to the remote control device for the automatic driving vehicle of the embodiments, and details are not described herein again.

With the remote control device for an automatic driving vehicle according to embodiments of the present disclosure, after receiving the remote control request from the automatic driving vehicle, the target wireless channel with the shortest communication delay is acquired from the plurality of candidate wireless channels of the candidate wireless networks according to the current geographic location of the automatic driving vehicle in combination with the receiving time of the remote control request, and the control instruction is transmitted to the automatic driving vehicle by using the target wireless channel of the target wireless network. Therefore, the control instruction can reach the automatic driving vehicle in time, and low-delay communication requirements of the automatic driving vehicle can be satisfied, such that the automatic driving vehicle may rapidly respond to the control instruction, thereby improving the driving safety of the automatic driving vehicle.

In order to achieve the above embodiments, the present disclosure further provides a server.

Figure 7:
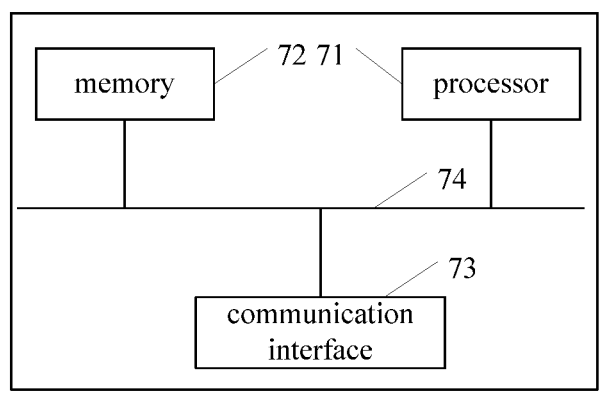
FIG. 7 is a schematic block diagram of a server according to an embodiment of the present disclosure.

FIG. 7 is a schematic block diagram of a server according to an embodiment of the present disclosure.

As illustrated in FIG. 7, the server comprises a processor 71, a memory 72, a communication interface 73, and a bus 74.

The processor 71, the memory 72 and the communication interface 73 are connected and communicate with each other via the bus 74. Executable program codes are stored in the memory 72. The processor 71 is configured to run a program corresponding to the executable program codes by reading the executable program codes stored in the memory 72 for implementing the remote control method for an automatic driving vehicle according to the above embodiments.

With the server of the embodiments of the present disclosure, after receiving a remote control request from the automatic driving vehicle, the target wireless channel with the shortest communication delay is acquired from the plurality of candidate wireless channels of the candidate wireless networks according to the current geographic location of the automatic driving vehicle in combination with the receiving time of the remote control request, and the target wireless network corresponding to the target wireless channel is acquired, and the control instruction is transmitted to the automatic driving vehicle by using the target wireless channel of the target wireless network. Therefore, the control instruction can reach the automatic driving vehicle in time, and low-delay communication requirements of the automatic driving vehicle can be satisfied, such that the automatic driving vehicle may rapidly respond to the control instruction, thereby improving the driving safety of the automatic driving vehicle.

Figure 8:
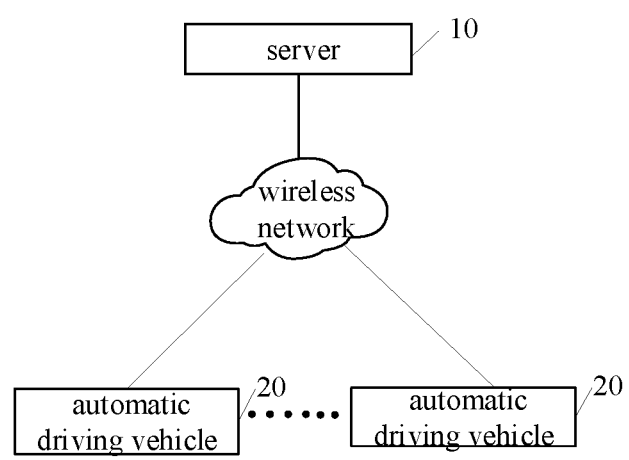
FIG. 8 is a schematic block diagram of a remote control system for an automatic driving vehicle according to an embodiment of the present disclosure.

FIG. 8 is a schematic block diagram of a remote control system for an automatic driving vehicle according to an embodiment of the present disclosure.

As illustrated in FIG. 8, the system includes a server 10 and an autonomous (automatic driving) vehicle 20.

The server 10 is configured to receive a remote control request transmitted by the automatic driving vehicle 20, to acquire current geographic location information of the automatic driving vehicle 20 according to the information carried by the remote control request, to acquire a target wireless channel with a shortest communication delay from a plurality of candidate wireless channels of a plurality of candidate wireless networks according to the current geographic location information, to acquire a target wireless network corresponding to the target wireless channel, to determine a corresponding control instruction according to the remote control request, and to transmit the control instruction by using the target wireless channel of the target wireless network.

The automatic driving vehicle 20 is configured to transmit the remote control request to the server 10, and to receive the control instruction transmitted by the server 10.

It should be noted that the foregoing description of the remote control method and device for the automatic driving vehicle is also applicable to the remote control system for the automatic driving vehicle of the embodiments, which is not limited in this embodiment.

With the remote control system for an automatic driving vehicle of the embodiments of the present disclosure, after receiving the remote control request from the automatic driving vehicle, the server acquires the target wireless channel with the shortest communication delay from the plurality of candidate wireless channels of the candidate wireless networks according to the current geographic location of the automatic driving vehicle in combination with the receiving time of the remote control request, and acquires the target wireless network corresponding to the target wireless channel, and transmits the control instruction to the automatic driving vehicle by using the target wireless channel of the target wireless network. Therefore, the control instruction can reach the automatic driving vehicle in time, and low-delay communication requirements of the automatic driving vehicle can be satisfied, such that the automatic driving vehicle may rapidly respond to the control instruction, thereby improving the driving safety of the automatic driving vehicle.

In order to achieve the above embodiments, the present disclosure further provides a non-transitory computer readable storage medium having a computer program stored thereon. When the computer program is executed by a processor, the remote control method for an automatic driving vehicle according to the embodiments of the present disclosure is implemented.

In order to achieve the above embodiments, the present disclosure further provides a computer program product. When instructions in the computer program product are executed by a processor, the remote control method for an automatic driving vehicle according to the embodiments of the present disclosure is implemented.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A remote control method for an automatic driving vehicle, applied to a server and comprising:
    receiving a remote control request transmitted by the automatic driving vehicle;
    acquiring current geographic location information of the automatic driving vehicle according to information carried by the remote control request;
    acquiring communication delays of candidate wireless channels of candidate wireless networks at the current geographic location, based on a pre-stored correspondence among geographic locations, wireless networks, wireless channels, and communication delays;
    determining a target wireless channel with a shortest communication delay from the candidate wireless channels of the candidate wireless networks according to the current geographic location information, and acquiring a target wireless network corresponding to the target wireless channel;
    determining a control instruction according to the remote control request; and
    transmitting the control instruction to the automatic driving vehicle by using the target wireless channel of the target wireless network;
    wherein the pre-stored correspondence is determined by:
        sending by the server, a PING probe packet to a test terminal located at each of the geographic locations by using each of the wireless channels for each of the wireless networks, and recording a first time of sending the PING probe packet;

receiving by the server, a PING reply packet sent from the test terminal and recording a second time of receiving the PING reply packet; and determining a communication delay of each of the wireless channels for each of the wireless networks at each of the geographic locations based on the first time and the second time.

2. The method according to claim 1, further comprising:

acquiring a third time when the remote control request is received by the server that communicates with the automatic driving vehicle via wireless networks; and acquiring the target wireless channel with the shortest communication delay from the plurality of candidate wireless channels of the plurality of candidate wireless networks according to the current geographic location information and the third time, and acquiring the target wireless network corresponding to the target wireless channel.

3. The method according to claim 2, wherein acquiring the target wireless channel with the shortest communication delay from the plurality of candidate wireless channels of the plurality of candidate wireless networks according to the current geographic location information and the third time, and acquiring the target wireless network corresponding to the target wireless channel, comprises:

determining communication delays corresponding to respective candidate wireless channels of respective candidate wireless networks, according to the third time and the current geographic location information; and acquiring the target wireless channel with the shortest communication delay according to communication delays corresponding to respective candidate wireless channels, and determining the target wireless network corresponding to the target wireless channel.

4. The method according to claim 1, wherein, before transmitting the control instruction to the automatic driving vehicle by using the target wireless channel of the target wireless network, the method further comprises:

acquiring priorities corresponding to N target wireless networks, where N is a positive integer greater than one, wherein the priority of each of the target wireless networks is determined based on a historical usage number of each of the target wireless networks;

acquiring a target wireless network with a highest priority according to the priorities corresponding to the N target wireless networks, and taking the target wireless network with the highest priority as the target wireless network; and acquiring a wireless channel corresponding to the target wireless network with the highest priority as the target wireless channel.

5. A remote control device for an automatic driving vehicle, comprising:

a processor; and a memory, configured to store software modules executable by the processor, wherein the processor is configured to run a program corresponding to the software modules by reading the software modules stored in the memory, the software modules comprising:

a receiving module, configured to receive a remote control request transmitted by the automatic driving vehicle;

a first acquiring module, configured to acquire current geographic location information of the automatic driving vehicle according to information carried by the remote control request;

a second acquiring module, configured to acquire communication delays of candidate wireless channels of candidate wireless networks at the current geographic location, based on a pre-stored correspondence among geographic locations, wireless networks, wireless channels, and communication delays; and determine a target wireless channel with a shortest communication delay from the candidate wireless channels of the candidate wireless networks according to the current geographic location information, and acquire a target wireless network corresponding to the target wireless channel;

a first determining module, configured to determine a control instruction according to the remote control request; and a transmitting module, configured to transmit the control instruction to the automatic driving vehicle by using the target wireless channel of the target wireless network;

wherein the pre-stored correspondence is determined by:

sending by the server, a PING probe packet to a test terminal located at each of the geographic locations by using each of the wireless channels for each of the wireless networks, and recording a first time of sending the PING probe packet;

receiving by the server, a PING reply packet sent from the test terminal and recording a second time of receiving the PING reply packet; and determining a communication delay of each of the wireless channels for each of the wireless networks at each of the geographic locations based on the first time and the second time.

6. The device according to claim 5, wherein the software modules further comprise:

a third acquiring module, configured to acquire a third time when the remote control request is received by the server that communicates with the automatic driving vehicle via wireless networks; and a second determining module, configured to acquire the target wireless channel with the shortest communication delay from the plurality of candidate wireless channels of the plurality of candidate wireless networks according to the third time and the current geographic location information, and acquire the target wireless channel corresponding to the target wireless network.

7. The device according to claim 6, wherein the second determining module is configured to:

determine communication delays of respective candidate wireless channels of respective candidate wireless networks, according to the current geographic location information and the third time; and acquire the target wireless channel with the shortest communication delay according to communication delays of the respective candidate wireless channels, and determine the target wireless network corresponding to the target wireless channel.

8. The device according to claim 5, wherein the software modules further comprises:

a fourth acquiring module, configured to acquire priorities corresponding to N target wireless networks, where N is a positive integer greater than one, wherein the priority of each of the target wireless networks is determined based on a historical usage number of each of the target wireless networks;

a fifth acquiring module, configured to acquire the target wireless network with a highest priority according to the priorities corresponding to the N target wireless networks, and take the target wireless network with the highest priority as the target wireless network; and a sixth acquiring module, configured to acquire a wireless channel corresponding to the target wireless network with the highest priority as the target wireless channel.

9. A non-transitory computer readable storage medium having a computer program stored thereon, wherein when the computer program is executed by a processor, a remote control method for an automatic driving vehicle is implemented, the computer program comprising:

program codes causing receiving a remote control request transmitted by the automatic driving vehicle;

program codes causing acquiring current geographic location information of the automatic driving vehicle according to information carried by the remote control request;

program codes causing acquiring communication delays of candidate wireless channels of candidate wireless networks at the current geographic location, based on a pre-stored correspondence among geographic locations, wireless networks, wireless channels, and communication delays;

program codes causing determining a target wireless channel with a shortest communication delay from the candidate wireless channels of the candidate wireless networks according to the current geographic location information, and acquiring a target wireless network corresponding to the target wireless channel;

program codes causing determining a control instruction according to the remote control request; and program codes causing transmitting the control instruction to the automatic driving vehicle by using the target wireless channel of the target wireless network;

wherein the pre-stored correspondence is determined by:
sending by the server, a PING probe packet to a test terminal located at each of the geographic locations by using each of the wireless channels for each of the wireless networks, and recording a first time of sending the PING probe packet;

receiving by the server, a PING reply packet sent from the test terminal and recording a second time of receiving the PING reply packet; and determining a communication delay of each of the wireless channels for each of the wireless networks at each of the geographic locations based on the first time and the second time.

10. The storage medium according to claim 9, wherein the computer program further comprises:

program codes causing acquiring a third time when the remote control request is received by the server that communicates with the automatic driving vehicle via wireless networks; and program codes causing acquiring the target wireless channel with the shortest communication delay from the plurality of candidate wireless channels of the plurality of candidate wireless networks according to the current geographic location information and the third time, and acquiring the target wireless network corresponding to the target wireless channel.

11. The storage medium according to claim 10, wherein the program codes causing acquiring the target wireless channel with the shortest communication delay from the plurality of candidate wireless channels of the plurality of candidate wireless networks according to the current geographic location information and the third time, and acquiring the target wireless network corresponding to the target wireless channel, comprises:

program codes causing determining communication delays corresponding to respective candidate wireless channels of respective candidate wireless networks, according to the third time and the current geographic location information; and program codes causing acquiring the target wireless channel with the shortest communication delay according to communication delays corresponding to respective candidate wireless channels, and determining the target wireless network corresponding to the target wireless channel.

12. The storage medium according to claim 9, wherein the program codes causing acquiring the target wireless network corresponding to the target wireless channel comprises:

program codes causing acquiring N wireless networks corresponding to the target wireless channel, where N is a positive integer greater than one, wherein the priority of each of the target wireless networks is determined based on a historical usage number of each of the target wireless networks;

program codes causing acquiring priorities corresponding to the N wireless networks;

program codes causing acquiring the wireless network with a highest priority according to the priorities corresponding to the N wireless networks, and taking the wireless network with the highest priority as the target wireless network, wherein the program codes causing transmitting the control instruction to the automatic driving vehicle by using the target wireless channel of the target wireless network comprises:

program codes causing transmitting the control instruction to the automatic driving vehicle by using the wireless channel corresponding to the target wireless network with the highest priority as the target wireless channel.

* * * * *